(12) United States Patent
Roh (10) Patent No.: US 9,538,445 B2
(45) Date of Patent: Jan. 3, 2017

(54) COMMUNICATION METHOD AND APPARATUS FOR ELECTRONIC DEVICE IN MOBILE COMMUNICATION SYSTEM

(71) Applicant: Samsung Electronics Co., Ltd., Gyeonggi-do (KR)

(72) Inventor: Byoungtack Roh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/467,866

(22) Filed: Aug. 25, 2014

(65) Prior Publication Data

US 2015/0055622 A1 Feb. 26, 2015

(30) Foreign Application Priority Data

Aug. 23, 2013 (KR) .................. 10-2013-0100040

(51) Int. Cl.
*H04W 4/00* (2009.01)
*H04W 36/26* (2009.01)
*H04W 36/22* (2009.01)
*H04W 28/08* (2009.01)

(52) U.S. Cl.
CPC .............. *H04W 36/26* (2013.01); *H04W 4/00* (2013.01); *H04W 28/08* (2013.01); *H04W 36/22* (2013.01)

(58) Field of Classification Search
CPC ...... H04W 36/22; H04W 28/08; H04W 36/26; H04W 4/00
USPC ........................................................ 370/331
See application file for complete search history.

(56) References Cited

U.S. PATENT DOCUMENTS

| 2004/0165563 A1* | 8/2004 | Hsu ...................... H04W 48/18 370/338 |
| 2006/0002355 A1 | 1/2006 | Baek et al. |
| 2008/0096560 A1* | 4/2008 | Felske ............... H04W 36/0083 455/436 |
| 2009/0088188 A1 | 4/2009 | Wormald et al. |
| 2015/0195057 A1* | 7/2015 | Tan ........................ H04J 11/005 370/252 |

FOREIGN PATENT DOCUMENTS

| KR | 102006000329 | 1/2006 |
| KR | 202009000640 | 6/2009 |
| KR | 102011012143 | 11/2011 |

\* cited by examiner

*Primary Examiner* — Sai-Ming Chan
(74) *Attorney, Agent, or Firm* — The Farrell Law Firm, P.C.

(57) ABSTRACT

A communication method and apparatus of an electronic device in a mobile communication system is provided. The method includes performing data communication through a cellular communication network, determining whether a service type of the data communication matches one of predetermined service types, and switching, when the service type of the data communication matches one of the predetermined service types, from the cellular communication network to a Wireless Local Area Network (WLAN) of an Access Point (AP) for which its beacon signal is received with a signal strength greater than or equal to a first threshold value.

25 Claims, 7 Drawing Sheets

COMMUNICATION METHOD AND APPARATUS FOR ELECTRONIC DEVICE IN MOBILE COMMUNICATION SYSTEM

PRIORITY

This application claims priority under 35 U.S.C. §119(a) to a Korean Patent Application filed on Aug. 23, 2013 in the Korean Intellectual Property Office and assigned Serial No. 10-2013-0100040, the entire contents of which are incorporated herein by reference.

BACKGROUND

1. Field of the Invention

The present invention relates generally to an electronic device and more particularly, to a communication method of and apparatus for an electronic device selectively using a cellular communication network and a Wireless Local Area Network (WLAN).

2. Description of the Related Art

Recently, there is a growing tendency for electronic devices to evolve as multimedia devices capable of supporting diverse supplementary services such as a digital organizer function, a game function, and a schedule management function. With the diversification of multimedia services supported by an electronic device, there is a need for a method of facilitating communication and managing the supplementary services efficiently.

Currently, a WLAN function-equipped electronic device stays in a Wireless Fidelity (Wi-Fi) on/off state according to a user setting whether or not a WLAN (Wi-Fi) Access Point (AP) is available.

If a Wi-Fi module of an electronic device is turned on in an area without an available Wi-Fi AP, electrical current is unnecessary wasted. In addition, if the user manually powers on/off a Wi-Fi module or if the electronic device is configured to always use a cellular communication network for communication regardless of the availability of a Wi-Fi connection, excessive communication costs are likely to result.

SUMMARY

The present invention has been made to solve the above-mentioned problems and disadvantages, and to provide at least the advantages described below. Accordingly, an aspect of the present invention provides a communication method and apparatus that is capable of allowing the electronic device to use the cellular communication network and WLAN selectively.

In accordance with an aspect of the present invention, a communication method of an electronic device in a mobile communication system is provided. The communication method includes performing data communication through a cellular communication network, determining whether a service type of the data communication matches one of predetermined service types, and switching, when the service type of the data communication matches one of the predetermined service types, from the cellular communication network to a Wireless Local Area Network (WLAN) of an Access Point (AP) for which its beacon signal is received with a signal strength greater than or greater than or equal to a first threshold value.

In accordance with another aspect of the present invention, an electronic device performing communication in a mobile communication system is provided. The electronic device includes a cellular communication module configured to communicate with a cellular communication network, a Wireless Local Area Network (WLAN) module configured to communicate with at least one Access Point (AP), and a processor configured to determine whether a service type of the data communication matches one of the predetermined service types in a state of communicating through the cellular communication network and control switching, when the service type matches one of the predetermined service types, from the cellular communication network to a WLAN of an Access Point (AP) for which its beacon signal is received with a signal strength greater than or equal to a first threshold value.

In accordance with another aspect of the present invention, a non-transitory computer-readable recording medium including a program for executing a communication method is provided. The communication method includes performing data communication through a cellular communication network; determining whether a service type of the data communication matches one of predetermined service types; and switching, when the service type matches one of the predetermined service types, from the cellular communication network to a Wireless Local Area Network (WLAN) of an Access Point (AP) for which its beacon is received with a signal strength greater than or equal to a first threshold value.

BRIEF DESCRIPTION OF THE DRAWINGS

The foregoing and other aspects, features, and advantages of the present invention will be more apparent from the following description, taken in conjunction with the accompanying drawings, in which.

DETAILED DESCRIPTION OF EMBODIMENTS OF THE PRESENT INVENTION

Hereinafter, embodiments of the present invention are described in detail with reference to the accompanying drawings. The present invention may be embodied in alternate forms and should not be construed as limited to the embodiments described below.

The terminology used herein to describe embodiments of the invention is not intended to limit the scope of the invention. Expressions such as "include" and "may include" which may be used in the present invention denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component, or a combination thereof, but may not be construed to exclude the existence, or a possibility, of an addition of one or more other characteristics, numbers, steps, operations, constituent elements, components, or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing one element from another element. For example, a first user device and a second user device indicate different user devices while both being user devices. For example, a first element could be referred to as a second element, and similarly, a second element could also be referred to as a first element without departing from the spirit and scope of the present invention.

In the case where a component is referred to as being "connected to" or "accessed by" another component, it should be understood that not only is the component directly connected to or accessed by the other component, but also there may exist another component therebetween. In the case where a component is referred to as being "directly connected to" or "directly accessed by" another component, it should be understood that there is no component therebetween. The terms used in the present disclosure are only used to describe embodiments of the present invention, and are not intended to limit the present invention. As used herein, singular forms are intended to include the plural forms, unless the context clearly indicates otherwise, and vice versa.

An electronic device according to the present invention may be a device including a communication function. For example, the device may include at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a TeleVision (TV), a Digital Video Disk (DVD) player, an audio device, various medical devices (for example, Magnetic Resonance Angiography (MRA), Magnetic Resonance Imaging (MRI), Computed Tomography (CT), a scanning machine, an ultrasonic wave device, or the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, a vehicle infotainment device, an electronic equipment for a ship (for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present invention is not limited to the aforementioned devices.

Figure 1:
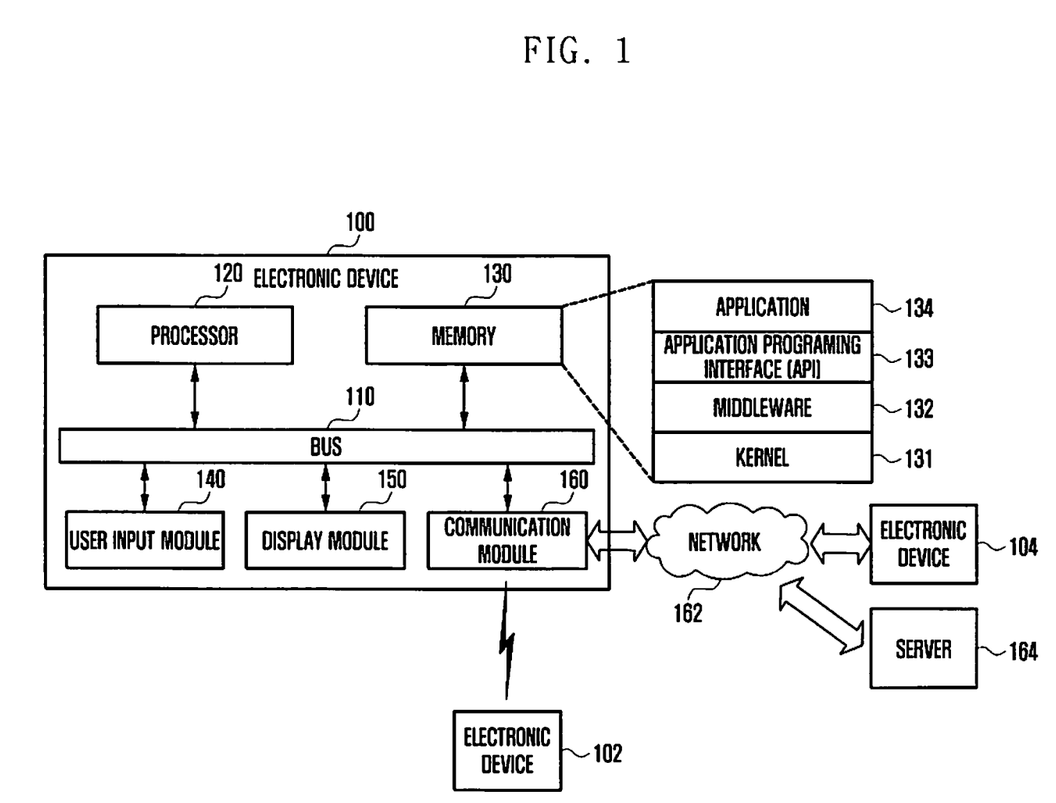
FIG. 1 is a block diagram of an electronic device according to an embodiment of the present invention.

FIG. 1 is a block diagram of an electronic device according to an embodiment of the present invention.

Referring to FIG. 1, the electronic device 100 includes a bus 110, a processor 120, a memory 130, a user input module 140, a display module 150, a communication module 160, and other similar and/or suitable components.

The bus 110 is a circuit which interconnects the above-described elements and delivers a communication (e.g., a control message) between the above-described elements.

The processor 120 receives commands from the above-described other elements (e.g., the memory 130, the user input module 140, the display module 150, the communication module 160, etc.) through the bus 110, interprets the received commands, and executes calculation or data processing according to the interpreted commands.

The memory 130 stores commands or data received from the processor 120 or other elements (e.g., the user input module 140, the display module 150, the communication module 160, etc.) or generated by the processor 120 or other elements. The memory 130 includes programming modules, such as a kernel 131, middleware 132, an Application Programming Interface (API) 133, an application 134, and the like. Each of the above-described programming modules may be implemented in software, firmware, hardware, or any combination thereof.

The kernel 131 controls or manages system resources (e.g., the bus 110, the processor 120, the memory 130, etc.) used to execute operations or functions implemented by other programming modules (e.g., the middleware 132, the API 133, and the application 134). In addition, the kernel 131 provides an interface capable of accessing and controlling or managing the individual elements of the electronic device 100 by using the middleware 132, the API 133, or the application 134.

The middleware 132 serves as an intermediary between the API 133 or the application 134 and the kernel 131 in such a manner that the API 133 or the application 134 can communicate with the kernel 131 and exchange data therewith. In relation to work requests received from one or more applications 134, the middleware 132, for example, may perform load balancing of the work requests by using a method of assigning a priority, where system resources (e.g., the bus 110, the processor 120, the memory 130, etc.) of the electronic device 100 may be used by at least one of the one or more applications 134.

The API 133 is an interface through which the application 134 can control a function provided by the kernel 131 or the middleware 132, and includes, for example, at least one interface or function for file control, window control, image processing, character control, or the like.

The user input module 140, for example, receives a command or data as input from a user, and delivers the received command or data to the processor 120 or the memory 130 through the bus 110. The display module 150 display a video, an image, data, or the like to the user.

The communication module 160 establishes communication between another electronic device 102, 104 and the electronic device 100. The communication module 160 may support a predetermined short-range communication protocol (e.g., Wi-Fi, BlueTooth (BT), and Near Field Communication (NFC)), or a predetermined network 162 communication (e.g., the Internet, a Local Area Network (LAN), a Wide Area Network (WAN), a telecommunication network, a cellular network, a satellite network, a Plain Old Telephone Service (POTS), or the like). Each of the electronic devices 102 and 104 may be identical (e.g., of an identical type) to, or different (e.g., of a different type) from, the electronic device 100. Furthermore, the communication module 160 establishes communication between a server 164 and the electronic device 100 via the network 162.

Figure 2:
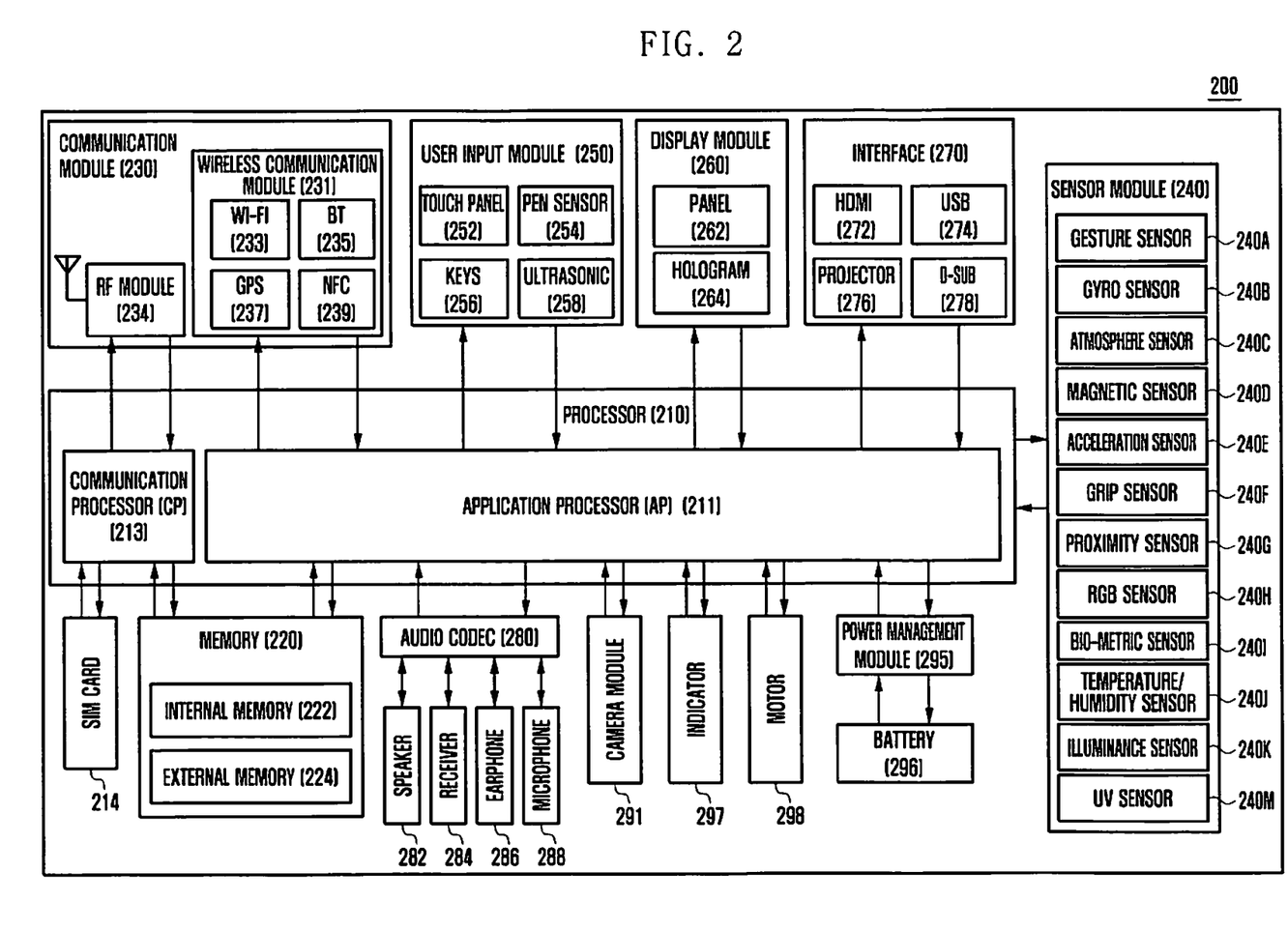
FIG. 2 is a block diagram of hardware according to an embodiment of the present invention.

FIG. 2 is a block diagram of hardware 200 according to an embodiment of the present invention.

The hardware 200 is, for example, the electronic device 100 illustrated in FIG. 1.

Referring to FIG. 2, the hardware 200 includes one or more processors 210, a Subscriber Identification Module (SIM) card 214, a memory 220, a communication module 230, a sensor module 240, a user input module 250, a display module 260, an interface 270, an audio coder/decoder (codec) 280, a camera module 291, a power management module 295, a battery 296, an indicator 297, a motor 298, and any other similar and/or suitable components.

The processor 210 (e.g., the processor 120) includes one or more Application Processors (APs) 211, or one or more Communication Processors (CPs) 213. The processor 210 may be, for example, the processor 120 illustrated in FIG. 1. The AP 211 and the CP 213 are illustrated as being in the processor 210 in FIG. 2 but may be in different Integrated Circuit (IC) packages, respectively. According to an embodiment of the present invention, the AP 211 and the CP 213 may be included in one IC package.

The AP 211 executes an Operating System (OS) or an application program, and thereby controls multiple hardware or software elements connected to the AP 211 and processes arithmetic operations on various data including multimedia data. The AP 211 may be implemented by, for example, a System on Chip (SoC). According to an embodiment of the present invention, the processor 210 may further include a Graphical Processing Unit (GPU).

The CP 213 manages a data line and converts a communication protocol in the case of communication between the electronic device (e.g., the electronic device 100) including the hardware 200 and different electronic devices connected to the electronic device through the network 162. The CP 213 may be implemented by, for example, a SoC. According to an embodiment of the present invention, the CP 213 performs at least one multimedia control functions. The CP 213, for example, distinguishes and authenticates a terminal in a communication network by using a Subscriber Identification Module (e.g., the SIM card 214). Also, the CP 213 provides the user with services, such as a voice telephony call function, a video telephony call function, text messaging, packet data delivery, and the like.

Furthermore, the CP 213 controls the transmission and reception of data by the communication module 230. In FIG. 2, the elements such as the CP 213, the power management module 295, the memory 220, and the like are illustrated as elements separate from the AP 211. However, according to an embodiment of the present invention, the AP 211 may include at least one (e.g., the CP 213) of the above-described elements.

According to an embodiment of the present invention, the AP 211 or the CP 213 loads, to a volatile memory, a command or data received from at least one of a non-volatile memory and other elements connected to each of the AP 211 and the CP 213, and processes the loaded command or data. Also, the AP 211 or the CP 213 stores, in a non-volatile memory, data received from or generated by at least one of the other elements.

The SIM card 214 is a card implementing a Subscriber Identification Module (SIM), and is inserted into a slot formed in a portion of the electronic device 100. The SIM card 214 includes unique identification information (e.g., Integrated Circuit Card IDentifier (ICCID)) or subscriber information (e.g., International Mobile Subscriber Identity (IMSI)).

The memory 220 includes an internal memory 222 and an external memory 224. The memory 220 may be, for example, the memory 130 illustrated in FIG. 1. The internal memory 222 may include, for example, at least one of a volatile memory (e.g., a Dynamic RAM (DRAM), a Static RAM (SRAM), a Synchronous Dynamic RAM (SDRAM), etc.), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NOT AND (NAND) flash memory, a NOT OR (NOR) flash memory, etc.). According to an embodiment of the present invention, the internal memory 222 may be in the form of a Solid State Drive (SSD). The external memory 224 may further include a flash drive, for example, a Compact Flash (CF), a Secure Digital (SD), a Micro-Secure Digital (Micro-SD), a Mini-Secure Digital (Mini-SD), an extreme Digital (xD), a memory stick, or the like.

The communication module 230 includes a wireless communication module 231 or a Radio Frequency (RE) module 234. The communication module 230 may be, for example, the communication module 160 illustrated in FIG. 1. The wireless communication module 231 may include, for example, a Wi-Fi unit 233, a BT unit 235, a GPS unit 237, or a NFC unit 239. For example, the wireless communication module 231 may provide a wireless communication function by using a radio frequency. Additionally or alternatively, the wireless communication module 231 may include a network interface (e.g., a LAN card), a modulator/demodulator (modem), or the like for connecting the hardware 200 to a network (e.g., the Internet, a LAN, a WAN, a telecommunication network, a cellular network, a satellite network, a POTS, or the like).

The RF module 234 is used for transmission and reception of data, for example, transmission and reception of RF signals or electrical signals. The RF unit 234 may include, for example, a transceiver, a Power Amplifier Module (PAM), a frequency filter, a Low Noise Amplifier (LNA), or the like. Also, the RF module 234 may further include a component for transmitting and receiving electromagnetic waves in free space via a wireless communication, for example, a conductor, a conductive wire, or the like.

The sensor module 240 includes, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red, Green and Blue (RGB) sensor 240H, a biometric sensor 240I, a temperature/humidity sensor 240J, an illuminance sensor 240K, and a Ultra Violet (UV) light sensor 240M. The sensor module 240 may measure a physical quantity or may sense an operating state of the electronic device 100, and may convert the measured or sensed information to an electrical signal. Additionally/alternatively, the sensor module 240 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein.

The user input module 250 includes a touch panel 252, a pen sensor 254 (e.g., a digital pen sensor), keys 256, and an ultrasonic input unit 258. The user input module 250 may be, for example, the user input module 140 illustrated in FIG. 1. The touch panel 252 recognizes a touch input in at least one of, for example, a capacitive scheme, a resistive scheme, an infrared scheme, and an acoustic wave scheme. Also, the touch panel 252 further includes a controller. In the capacitive type, the touch panel 252 is capable of recognizing proximity as well as a direct touch. The touch panel 252 may further include a tactile layer. In this case, the touch panel 252 provides a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of wireless recognition. According to an embodiment of the present invention, the hardware 200 receives a user input from an external device (e.g., a network, a computer, or a server), which is connected to the hardware 200, through the communication module 230.

The display module 260 includes a panel 262 or a hologram 264. The display module 260 may be, for example, the display module 150 illustrated in FIG. 1. The panel 262 may be, for example, a Liquid Crystal Display (LCD) and an Active Matrix Organic Light Emitting Diode (AM-OLED) display, and the like. The panel 262 may be implemented so as to be, for example, flexible, transparent, or wearable. The panel 262 may include the touch panel 252 and one module. The hologram 264 may display a three-dimensional image in the air by using interference of light. According to an embodiment of the present invention, the display module 260 may further include a control circuit for controlling the panel 262 or the hologram 264.

The interface 270 includes, for example, a High-Definition Multimedia Interface (HDMI) 272, a Universal Serial Bus (USB) 274, a projector 276, and a D-subminiature (D-sub) 278. Additionally or alternatively, the interface 270 may include, for example, SD/Multi-Media Card (MMC) or Infrared Data Association (IrDA).

The audio codec 280 bidirectionally converts a voice to an electrical signal and vice versa. The audio codec 280 converts voice information, which is input to, or output from, the audio codec 280 through, for example, a speaker 282, a receiver 284, an earphone 286, the microphone 288 or the like.

The camera module 291 captures an image and a moving image. According to an embodiment of the present invention, the camera module 291 may include one or more image sensors (e.g., a front lens or a back lens), an Image Signal Processor (ISP), and a flash LED.

The power management module 295 manages power of the hardware 200. The power management module 295 may include, for example, a Power Management Integrated Circuit (PMIC), a charger Integrated Circuit (IC), or a battery fuel gauge.

The PMIC may be mounted to, for example, an IC or an SoC semiconductor. Charging methods may be classified into a wired charging method and a wireless charging method. The charger IC may charge a battery, and may prevent an overvoltage or an overcurrent from a charger to the battery. According to an embodiment of the present invention, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging.

The battery fuel gauge measures, for example, a residual quantity of the battery 296, or a voltage, a current, or a temperature during charging. The battery 296 supplies power by generating electricity, and may be, for example, a rechargeable battery.

The indicator 297 indicates particular states of the hardware 200 or a part (e.g., the AP 211) of the hardware 200, for example, a booting state, a message state, a charging state, and the like. The motor 298 converts an electrical signal into a mechanical vibration. The processor 210 controls the sensor module 240.

The hardware 200 may include a processing unit (e.g., a GPU) for supporting a module TV. The processing unit for supporting a module TV may process media data according to standards such as, for example, Digital Multimedia Broadcasting (DMB), Digital Video Broadcasting (DVB), media flow, and the like. Each of the above-described elements of the hardware 200 according to an embodiment of the present invention may include one or more components, and the name of the relevant element may change depending on the type of electronic device. The hardware 200 according to an embodiment of the present invention may include at least one of the above-described elements. Some of the above-described elements may be omitted from the hardware 200, or the hardware 200 may further include additional elements. Also, some of the elements of the hardware 200, according to an embodiment of the present invention, may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module," according to an embodiment of the present invention, may include at least one of an Application-Specific Integrated Circuit (ASIC), a Field-Programmable Gate Array (FPGA), and a programmable-logic device for performing certain operations which have been known or are to be developed in the future.

Figure 3:
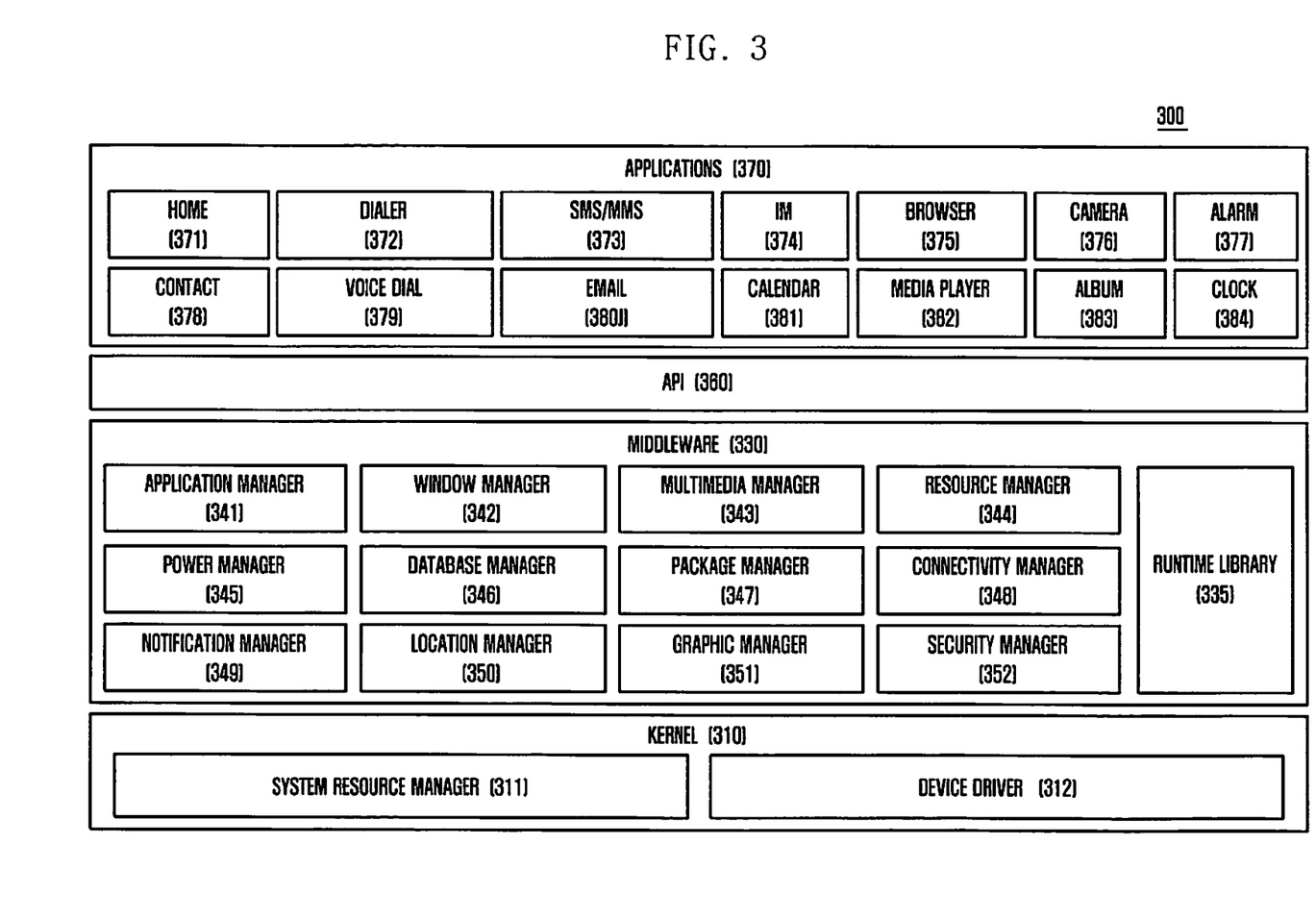
FIG. 3 is a block diagram of a programming module according to an embodiment of the present invention.

FIG. 3 is a block diagram of a programming module 300 according to an embodiment of the present invention.

The programming module 300 may be included (or stored) in the electronic device 100 (e.g., the memory 130) or may be included (or stored) in the electronic device 200 (e.g., the memory 230) illustrated in FIG. 1. At least a part of the programming module 300 may be implemented in software, firmware, hardware, or any combination thereof. The programming module 300 may be implemented in hardware (e.g., the hardware 200), and may include an OS controlling resources related to an electronic device (e.g., the electronic device 100) and/or various applications (e.g., applications 370) executed in the OS. For example, the OS may be Android, iOS, Windows®, Symbian, Tizen™, Bada, and the like.

Referring to FIG. 3, the programming module 300 includes a kernel 310, a middleware 330, an API 360, and/or the applications 370.

The kernel 310 (e.g., the kernel 131) includes a system resource manager 311 and/or a device driver 312. The system resource manager 311 may include, for example, a process manager, a memory manager, and a file system manager. The system resource manager 311 performs the control, allocation, recovery, and/or the like of system resources. The device driver 312 may include, for example, a display driver, a camera driver, a Bluetooth driver, a shared memory driver, a USB driver, a keypad driver, a Wi-Fi driver, and/or an audio driver. Also, according to an embodiment of the present invention, the device driver 312 may include an Inter-Process Communication (IPC) driver.

The middleware 330 includes multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present invention, the runtime library 335 perform functions which are related to input and output, the management of a memory, an arithmetic function, and/or the like.

The application manager 341 manages, for example, a life cycle of at least one of the applications 370. The window manager 342 manages Graphical User Interface (GUI) resources used on the screen. The multimedia manager 343 detects a format used to reproduce various media files and encodes or decodes a media file through a codec appropriate for the relevant format. The resource manager 344 manages resources, such as a source code, a memory, a storage space, and/or the like of at least one of the applications 370.

The power manager 345 operates together with a Basic Input/Output System (BIOS), manages a battery or power, and provides power information and the like used for an operation. The database manager 346 manages a database in such a manner as to enable the generation, search and/or change of the database to be used by at least one of the applications 370. The package manager 347 manages the installation and/or update of an application distributed in the form of a package file.

The connectivity manager 348 manages a wireless connectivity such as, for example, Wi-Fi and Bluetooth. The notification manager 349 displays or reports, to the user, an event such as an arrival message, an appointment, a proximity alarm, and the like in such a manner as not to disturb the user. The location manager 350 manages location information of the electronic device. The graphic manager 351 manages a graphic effect, which is to be provided to the user, and/or a user interface related to the graphic effect. The security manager 352 provides various security functions used for system security, user authentication, and the like. According to an embodiment of the present invention, when the electronic device (e.g., the electronic device 100) has a telephone function, the middleware 330 further includes a telephony manager for managing a voice telephony call function and/or a video telephony call function of the electronic device.

The middleware 330 generates and uses a new middleware module through various functional combinations of the above-described internal element modules. The middleware 330 provides modules specialized according to types of OSs in order to provide differentiated functions. Also, the middleware 330 may dynamically delete some of the existing elements, or may add new elements. Accordingly, the middleware 330 may omit some of the elements described in the various embodiments of the present invention, may further include other elements, or may replace some of the elements with other elements, each of which performs a similar function but has a different name.

The API 360 (e.g., the API 133) is a set of API programming functions, each of which is provided with a different configuration according to an OS. In the case of Android or iOS, for example, one API set may be provided to each platform. In the case of Tizen™, for example, two or more API sets may be provided to each platform.

The applications 370 (e.g., the applications 134) include, for example, a preloaded application and/or a third party application. The applications 370 (e.g., the applications 134) include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors performs functions corresponding to the instructions. The non-transitory computer-readable storage medium may be, for example, the memory 220. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Names of the elements of the programming module (e.g., the programming module 300), according to an embodiment of the present invention, may change depending on the type of OS. The programming module, according to an embodiment of the present invention, may include one or more of the above-described elements. Alternatively, some of the above-described elements may be omitted from the programming module. Alternatively, the programming module may further include additional elements. The operations performed by the programming module or other elements, according to an embodiment of the present invention, may be processed in a sequential method, a parallel method, a repetitive method, or a heuristic method. Also, some of the operations may be omitted, or other operations may be added to the operations.

Figure 4:
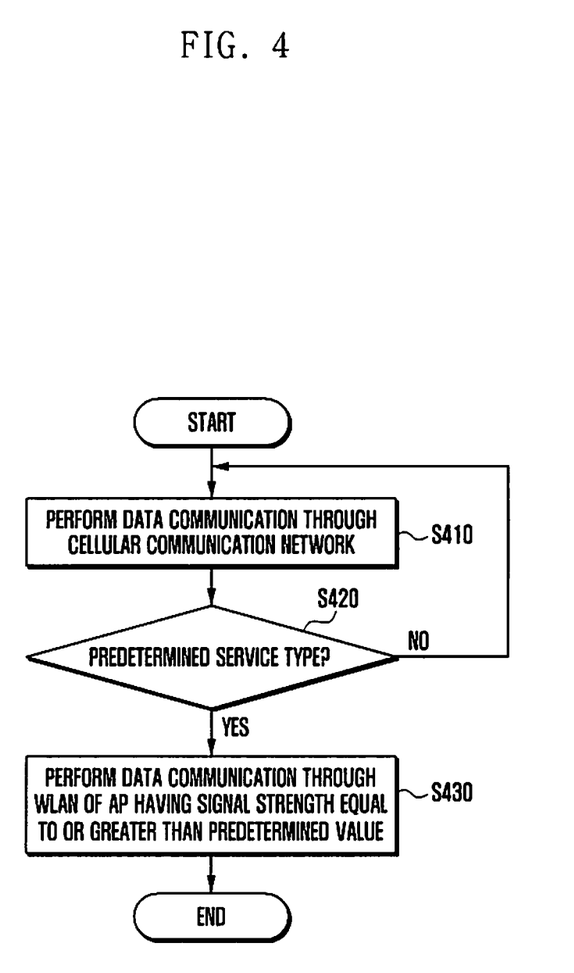
FIG. 4 is a flowchart of a method of an electronic device according to an embodiment of the present invention.

FIG. 4 is a flowchart of a method of an electronic device according to an embodiment of the present invention.

The electronic device performs data communication through a cellular communication network at step S410. Next, the electronic device determines whether the service type of the current data communication matches a predetermined service type at step S420.

Examples of the predetermined data type include streaming service of movie or music, Internet phone service such as Voice over Internet Protocol (VoIP), and packet service for transmitting a packet greater than or equal to a predetermined size during a predetermined period.

The electronic device analyzes the header of the packet to determine whether the service type of current data is VoIP. The electronic device may also check the size of the data packet to be communicated before actually communicating the data packet.

If it is determined at step S420 that the service type of the current data communication matches the predetermined service type, the electronic device attempts to access the AP of which transmission power is greater than or equal to a predetermined value at step S430. Then the electronic device performs communication through the WLAN of the AR. For example, the electronic device may transmit and receive data packets through the WLAN instead of the cellular communication network.

The Wi-Fi (WLAN) APs broadcast beacon frames including Service Set Identifier (SSID) and Media Access Control (MAC) address periodically, and the mobile station (e.g. electronic device) selects an AP to determine the subnet to which it belongs.

Figure 5:
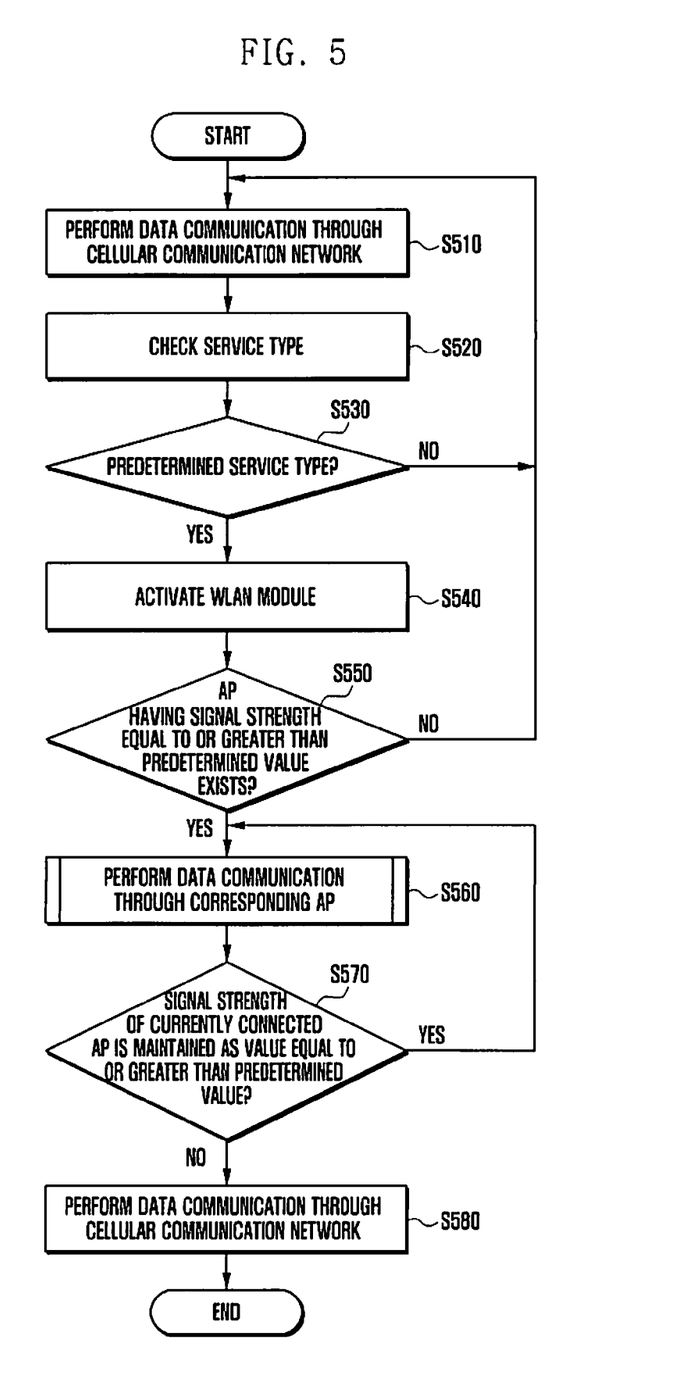
FIG. 5 is a flowchart of a method of an electronic device according to an embodiment of the present invention.

FIG. 5 is a flowchart of a method of the electronic device according to an embodiment of the present invention.

The method of FIG. 5 includes detailed steps of the electronic device in addition to the steps of FIG. 4.

The electronic device performs data communication through a cellular communication network at step S510.

The electronic device checks the service type of the current data communication at step S520. The electronic device determines whether the service type of the current data communication matches one of the predetermined service types, e.g. streaming service, VoIP service, and data packet service for transmitting a packet greater than or equal to a predetermined size, at step S530.

If the service type of the current data communication matches one of the predetermined service types, the electronic device activates a WLAN module at step S540. If the WLAN module is activated, it receives beacon frames transmitted by APs and measures the received signal strengths of the beacon frames. The electronic device receives at least one AP and measures the received signal strength of the beacon signal transmitted by the at least one AP.

At step S550, the electronic device determines whether there is any AP for which its beacon signal was received with a signal strength greater than or equal to a first threshold value.

If there is no AP for which its beacon signal was received with a signal strength greater than or equal to the first threshold value, the electronic device continues the data communication through the cellular communication network.

Otherwise, if there is any AP for which its beacon signal is received with a signal strength greater than or equal to the first threshold value, the electronic device performs data communication through the corresponding AP, i.e. the WLAN of the AP, at step S560. According to an embodiment of the present invention, if the number of APs for which its beacon signal is received with a signal strength greater than or equal to the first threshold value, the electronic device performs data communication through the WLAN of the AP having the greatest received signal strength or the WLAN of the AP selected by the user among the APs of which received signal strengths are greater than or equal to the first threshold value.

Next, the electronic device determines whether the received signal strength of the currently connected AP maintains a value greater than or equal to a second threshold value at step S570.

According to an embodiment of the present invention, the second threshold value is changed according to the channel state of the cellular communication network. For example, the second threshold value for the case where the channel state between the electronic device and the cellular communication network is good may be set to a value greater than the second threshold value for the case where the channel state between the electronic device and the cellular communication network is bad.

The electronic device, for performing a type of data communication, may use the WLAN rather than the cellular communication network to a maximum extent as possible. For example, When the size of a data packet to be received is large, it is preferred to receive the data packet through the WLAN rather than the more expensive cellular communication network, to reduce communication costs.

Although it is described above that the second threshold value is changed according to the channel state between the electronic device and the cellular communication network, the present invention is not limited thereto but may change the first threshold value in the same principle.

Returning to step S570, if the received signal strength of the currently connected AP maintains the value greater than or equal to the second threshold value, the electronic device continues the data communication through the WLAN.

Otherwise, if the received signal strength of the currently connected AP does not maintain the value greater than or equal to the second threshold value, the electronic device performs data communication through the cellular communication network at step S580.

Figure 6:
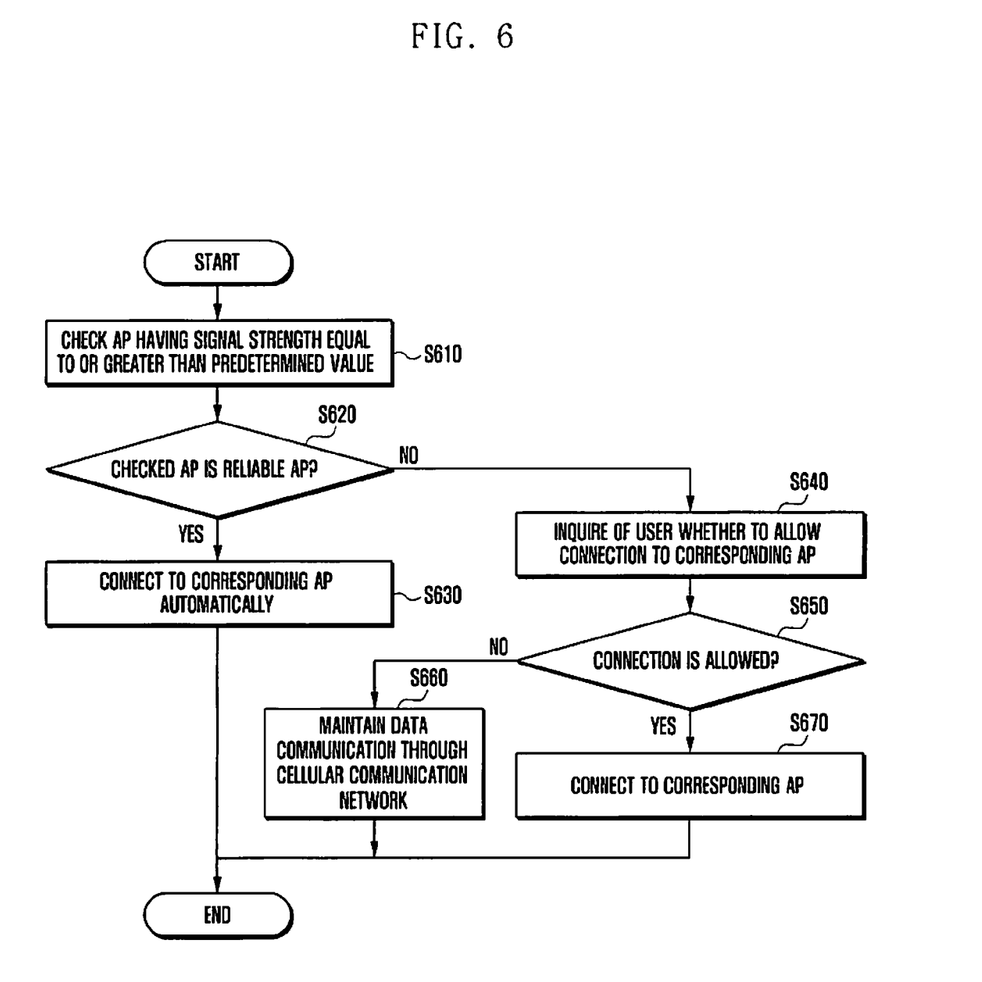
FIG. 6 is a flowchart of the method of the electronic device of FIG. 5.

FIG. 6 is a flowchart of the method of step S560 of FIG. 5.

The electronic device checks the AP for which its beacon signal is received with a signal strength greater than or equal to a predetermined threshold value at step S610. For example, the electronic device may check at least one AP for which its received signal strength is greater than or equal to the threshold value.

At step S620, the electronic device determines whether the AP for which its beacon signal is received with a signal strength greater than or equal to the threshold value is a reliable AP. The reliable AP may be the AP pre-registered by the user. According to an embodiment of the present invention, the user may sort the APs installed in a specific area into a reliable AP group. The electronic device may also sort certain APs into the reliable AP group automatically, based on log-based connection times or AP locations checked through the Location Based Service (LBS).

If the AP for which its beacon signal is received with a signal strength greater than or equal to the threshold value is a reliable AP at step S620, the electronic device connects to the corresponding AP automatically at step S630. For example, if the radio channel state of the reliable AP preregistered by the user is good, the electronic device connects to the AP automatically without an extra procedure.

Otherwise, if the AP for which its beacon signal is received with a signal strength greater than or equal to the threshold value is not a reliable AP at step S620, the electronic device inquires of the user whether to connect to the corresponding AP at step S640. For example, the electronic may inquire of the user whether to allow a connection to the found AP so as to switch the data communication from the cellular communication network to the WLAN through a User Interface (UI).

The electronic device determines whether a user command allowing for the connection is received at step S650. If the user command allowing for the connection is received, the electronic device connects to the corresponding AP at step S670.

Otherwise, if no user command allowing for the connection is received, the electronic device maintains the data communication through the cellular communication network at step S660.

Figure 7:
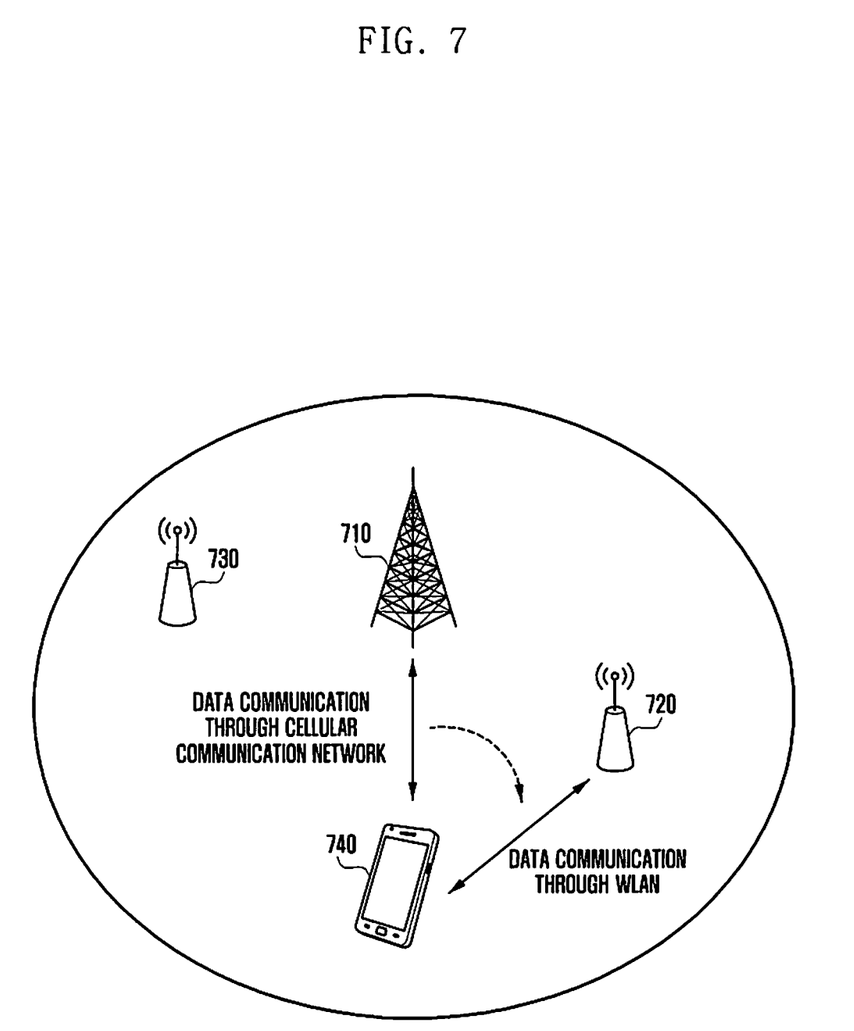
FIG. 7 is a diagram illustrating a communication method of an electronic device according to an embodiment of the present invention.

FIG. 7 is a diagram illustrating a communication method of the electronic device according to an embodiment of the present invention.

The cellular base station 710 provides the electronic device 740 with a radio communication service. The cellular base station 710 exchanges control information and data with the electronic device 740 through a radio channel established therebetween. According to an embodiment of the present invention, the cellular base station 710 provides at least one of the Second Generation (2G), Third Generation (3G), Fourth Generation (4G) or Long Term Evolution (LTE), LTE-Advanced (LTE-A), Fifth Generation (5G), and Wireless Broadband (WiBro) services, without limitation thereto.

The AP 720 and AP 730 provide the electronic device 740 with mobile communication service. An AP is a node forming a WLAN through wireless connection with the electronic device 740 and may connect the electronic device 740 to the Internet.

According to an embodiment of the present invention, the electronic device 740 communicates with the cellular base station 710. The user may want to search for an AP and, if found, establish a WLAN connection to the AP for higher speed communication. However, if the WLAN module is always in the on-state, unnecessary power drain of the electronic device 740 results.

According to an embodiment of the present invention, the electronic device is configured to activate the WLAN module for communication only when a predetermined condition is satisfied.

As described above, the electronic device 740, according to an embodiment of the present invention, activates the WLAN module to discover an AP only for at least one of predetermined service types including the streaming service, VoIP service, and packet data service for transmitting a packet greater than or equal to a predetermined size. In the case that there is any AP for which its beacon signal is received with a signal strength greater than or equal to a predetermined value among the found APs, the electronic device switches the communication from the cellular communication network to the WLAN.

The communication network and apparatus of the present invention restricts the use the WLAN to predetermined situations so as to increase the battery life span of the electronic device while minimizing the use of the more expensive cellular communication network, resulting in reduced communication costs.

While the embodiment of the present invention has been described in the detailed description of the present invention, the present invention may be modified in various forms without departing from the scope of the present invention. Thus, the scope of the present invention shall not be determined merely based on the described embodiments but rather determined based on the accompanying claims and the equivalents thereto.

What is claimed is:

1. A communication method of an electronic device in a mobile communication system, the method comprising:
   performing data communication through a cellular communication network;
   identifying a type of a service requested by a user while performing data communication through the cellular communication network;
   determining whether to switch between the cellular communication network and a Wireless Local Area Network (WLAN) while the data communication is performed through the cellular communication network, based on the identified type of the service; and
   switching between the cellular communication network and the WLAN when the type of the service corresponds to one of predetermined service types.

2. The method of claim 1, wherein the predetermined service types comprise streaming service, Voice over Internet Protocol (VoIP) service, and packet data service for transmitting a packet greater than or equal to a predetermined size during a predetermined period.

3. The method of claim 1, wherein switching between the cellular communication network and the WLAN comprises:
   determining whether an Access Point (AP) corresponding to the WLAN is a reliable AP; and
   attempting, when the AP is a reliable AP, to connect to the reliable AP automatically.

4. The method of claim 3, further comprising:
   inquiring, when the AP is not the reliable AP, of a user whether to allow connection to the AP; and
   attempting, when the connection to the AP is allowed, to connect to the AP.

5. The method of claim 3, wherein the reliable AP is one of a preregistered AP, an AP connected during a period greater than or equal to the predetermined time, and an AP verified based on a Location Based Service (LBS).

6. The method of claim 1, wherein determining whether to switch from the cellular communication network to the WLAN comprises:
   determining whether to switch between the cellular communication network and the WLAN while the data communication is performed through the cellular communication network, based on the identified type of the service and a speed of data communication of the WLAN, and
   wherein switching between the cellular communication network and the WLAN comprises switching between the cellular communication network and the WLAN when the type of the service corresponds to one of predetermined service types and the speed of data communication of the WLAN is greater than a predetermined threshold.

7. The method of claim 6, wherein the predetermined threshold is associated with a speed of data communication of the cellular communication network.

8. An electronic device performing communication in a mobile communication system, the device comprising:

a cellular communication module configured to communicate with a cellular communication network;
a Wireless Local Area Network (WLAN) module configured to communicate with at least one Access Point (AP); and
a processor configured to:
control to perform data communication through the cellular communication network,
identify a type of a service requested by a user while performing data communication through the cellular communication network,
determine whether to switch between the cellular communication network and a Wireless Local Area Network (WLAN) while the data communication is performed through the cellular communication network, based on the identified type of the service, and
switch between the cellular communication network and the WLAN when the type of the service corresponds to one of predetermined service types.

9. The device of claim 8, wherein the predetermined service types comprise streaming service, Voice over Internet Protocol (VoIP) service, and packet data service for transmitting a packet greater than or equal to a predetermined size during a predetermined period.

10. The device of claim 8, wherein the processor is configured to determine whether an AP corresponding to the WLAN is a reliable AP and control attempts, when the AP is a reliable AP, to connect to the reliable AP automatically.

11. The device of claim 10, wherein the processor is configured to inquire, when the AP is not a reliable AP, of a user whether to allow connection to the AP and control attempts, when the connection to the AP is allowed, to connect to the AP.

12. The device of claim 10, wherein the reliable AP is one of a preregistered AP, an AP connected during a period greater than or equal to the predetermined time, and an AP verified based on a Location Based Service (LBS).

13. The device of claim 8, wherein the processor is configured to compare a signal strength of an AP corresponding to the WLAN with a second threshold value in a state of communicating through the WLAN and maintain, when the signal strength of AP is greater than or equal to the second threshold value, the data communication through the WLAN and switch, when the signal strength of the AP is less than the second threshold value, from the WLAN to the cellular communication network.

14. The device of claim 12, wherein the processor is configured to change the second threshold value according to a radio channel state between the cellular communication network and the electronic device.

15. A non-transitory computer-readable recording medium including a program for executing a communication method, the communication method comprising:
performing data communication through a cellular communication network;
identifying a type of a service requested by a user while performing data communication through the cellular communication network;
determining whether to switch between the cellular communication network and a Wireless Local Area Network (WLAN) while the data communication is performed through the cellular communication network, based on the identified type of the service; and
switching between the cellular communication network and the WLAN when the type of the service corresponds to one of predetermined service types.

16. The non-transitory computer-readable recording medium of claim 15, wherein the predetermined service types comprise streaming service, Voice over Internet Protocol (VoIP) service, and packet data service for transmitting a packet greater than or equal to a predetermined size during a predetermined period.

17. The non-transitory computer-readable recording medium of claim 15, wherein switching between the cellular communication network and a WLAN of an Access Point (AP) comprises:
determining whether an AP corresponding to the WLAN is a reliable AP; and
attempting, when the AP is a reliable AP, to connect to the reliable AP automatically.

18. The non-transitory computer-readable recording medium of claim 17, wherein the method further comprising:
inquiring, when the AP is not a reliable AP, of a user whether to allow connection to the AP; and
attempting, when the connection to the AP is allowed, to connect to the AP.

19. The non-transitory computer-readable recording medium of claim 17, wherein the reliable AP is one of a preregistered AP, an AP connected during a period greater than or equal to the predetermined time, and an AP verified based on a Location Based Service (LBS).

20. The non-transitory computer-readable recording medium of claim 15, wherein the method further comprising:
comparing a strength of a signal of an Access Point (AP) with a second threshold value in a state of communicating through the WLAN;
maintaining, when the strength of the signal of the AP is greater than or equal to the second threshold value, the data communication through the WLAN; and
switching, when the strength of the signal of the AP is less than the second threshold value, from the WLAN to the cellular communication network.

21. The non-transitory computer-readable recording medium of claim 20, further comprising changing the second threshold value according to a radio channel state between the cellular communication network and the electronic device.

22. The method of claim 1, wherein switching between the cellular communication network and the WLAN comprises:
measuring a strength of a signal of an Access Point (AP) corresponding to the WLAN; and
switching between the cellular communication network and the WLAN when the strength of the signal is greater than or equal to a first threshold value.

23. The device of claim 8, wherein the controller is configured to measure a strength of a signal of an AP corresponding to the WLAN, and switch between the cellular communication network and the WLAN when the strength of the signal is greater than or equal to a first threshold value.

24. The non-transitory computer-readable recording medium of claim 15, wherein switching between the cellular communication network and the WLAN comprises:
measuring a strength of a signal of an Access Point (AP) corresponding to the WLAN; and
switching between the cellular communication network and the WLAN when the strength of the signal is greater than or equal to a first threshold value.

25. The method of claim 6, further comprising:
maintaining data communication through the cellular communication network when the type of the service does not correspond to any one of the predetermined service types or the speed of data communication of the WLAN is less than the predetermined threshold.

* * * * *